US009352932B2

(12) United States Patent
Soper

(10) Patent No.: US 9,352,932 B2
(45) Date of Patent: May 31, 2016

(54) SPEED CONTROL FOR CABLE RETRACTOR

(71) Applicant: RGB SYSTEMS, INC., Anaheim, CA (US)

(72) Inventor: Matthew Soper, Clayton, NC (US)

(73) Assignee: RGB Systems, Inc., Anaheim, CA (US)

( * ) Notice: Subject to any disclaimer, the term of this patent is extended or adjusted under 35 U.S.C. 154(b) by 210 days.

(21) Appl. No.: 14/085,719

(22) Filed: Nov. 20, 2013

(65) Prior Publication Data

US 2014/0151487 A1 Jun. 5, 2014

Related U.S. Application Data

(63) Continuation-in-part of application No. 12/795,611, filed on Jun. 7, 2010, now Pat. No. 8,740,127.

(60) Provisional application No. 61/186,346, filed on Jun. 11, 2009.

(51) Int. Cl.
*B65H 75/36* (2006.01)
*B65H 75/44* (2006.01)
*H02G 11/00* (2006.01)

(52) U.S. Cl.
CPC .......... *B65H 75/368* (2013.01); *B65H 75/4421* (2013.01); *H02G 11/003* (2013.01); *B65H 2701/34* (2013.01)

(58) Field of Classification Search
CPC ............. B65H 75/368; B65H 2701/34; B65H 75/4439; B65H 75/4421; H02G 11/003
USPC .................. 242/388, 388.9, 388.91
See application file for complete search history.

(56) References Cited

U.S. PATENT DOCUMENTS

| 2,174,828 | A | | 10/1939 | Latocha | |
|---|---|---|---|---|---|
| 4,174,816 | A | * | 11/1979 | Olson | B65H 75/36 242/272 |
| 8,469,305 | B2 | | 6/2013 | Feldstein | |
| 2008/0156922 | A1 | * | 7/2008 | Rabinowitz | B65H 75/368 242/372 |
| 2010/0062696 | A1 | * | 3/2010 | Hart | B24B 53/017 45/444 |
| 2012/0175452 | A1 | * | 7/2012 | Feldstein | B65H 75/368 242/381 |
| 2014/0111158 | A1 | | 4/2014 | Kinomura | |

FOREIGN PATENT DOCUMENTS

| WO | 2009/091745 A2 | 7/2009 |
|---|---|---|
| WO | 2013/005326 A1 | 1/2013 |

OTHER PUBLICATIONS

European Patent Office, Extended European Search Report, Apr. 13, 2015, App. No. EP 14 18 8680.

* cited by examiner

*Primary Examiner* — William A Rivera
(74) *Attorney, Agent, or Firm* — The Hecker Law Group, PLC

(57) ABSTRACT

The present invention is a speed control for a cable retractor. The cable retractor with which the speed control is used comprises a pulley that engages a cable that may be extended and retracted. A friction element configured to adjustably contact the cable adjacent to the pulley is attached to a movable linkage. The movement of the linkage is constrained to move along a predetermined path such that movement of the linkage along the path alters the distance between the friction element and the pulley. In one or more embodiments a cantilevered spring is attached to the linkage. An adjustable control, for example a thumbscrew, is configured to move the spring in relation to the linkage in a manner that alters the position of the friction element with respect to the cable and/or the pressure exerted by the friction element on the cable.

10 Claims, 17 Drawing Sheets

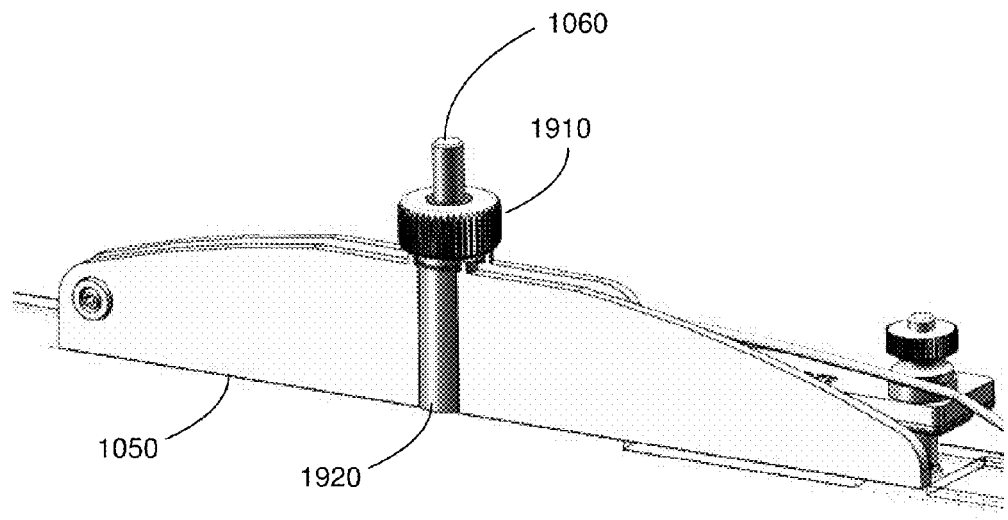
Figure 19
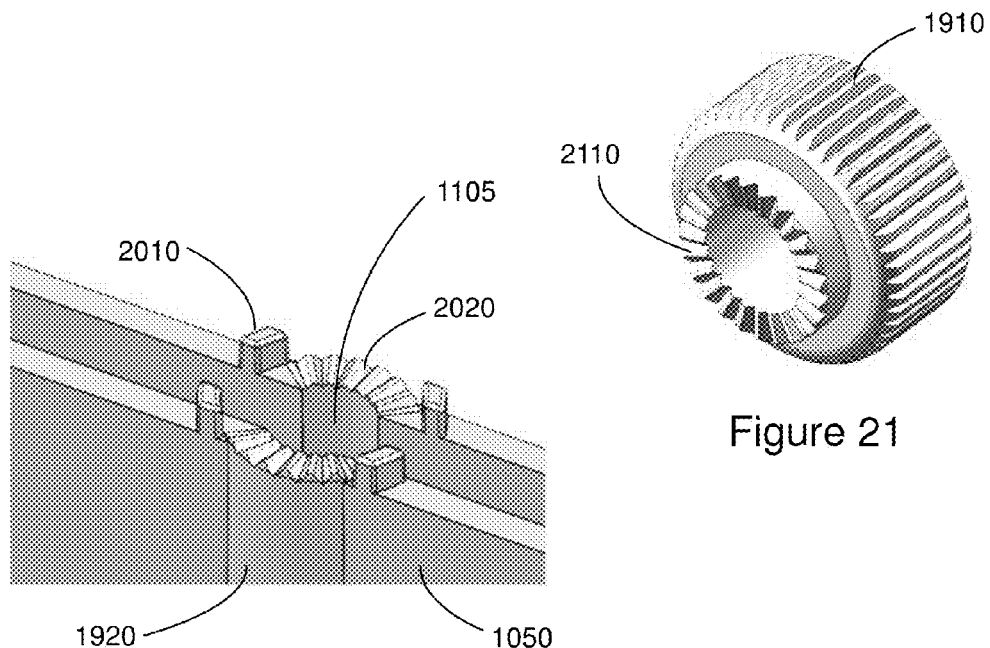
Figure 20
Figure 21

SPEED CONTROL FOR CABLE RETRACTOR

CROSS-REFERENCE TO RELATED APPLICATION

This patent application is a continuation-in-part of U.S. patent application Ser. No. 12/795,611 filed Jun. 7, 2010, which claims the benefit of the filing date of U.S. Provisional Patent Application No. 61/186,346 filed Jun. 11, 2009, both of which are incorporated by reference in their entirety herein.

BACKGROUND OF THE INVENTION (1) Field of the Invention

The present invention relates generally to mechanical apparatus for management of electrical cabling and, more specifically, to an adjustable speed control for a cable retractor that facilitates the controlled extension and retraction of cabling.

(2) Description of the Related Art

Electronic equipment is typically interconnected by cables. Cables are often equipped with connectors that allow their connection to and disconnection from equipment. When cables are longer than necessary or are disconnected from equipment, they can be awkward and untidy.

Prior art cable retractors exist that allow the extension and retraction of cables. Kim et al., U.S. Patent Publication No. 2008/0055237, discloses a cable retractor having multiple spring biased pulleys that move towards each other during cable extension and away from each other under spring tension during retraction. Rabinowitz, U.S. Patent Publication No. 2008/0156922 and Feinstein et al., U.S. Pat. No. 8,469,305 each disclose a cable retractor that includes a stationary and a movable set of pulleys around which the cable is wound. A spring biases the movable pulleys away from the stationary pulleys. Extension of the cable pulls the movable pulleys closer to the stationary pulleys against the spring's tension. When the extended cable is released, the spring tension moves the movable pulleys away from the stationary pulleys, retracting the cable. Feinstein et al. discloses a speed control mechanism that includes a gear attached to one of the stationary pulleys and a rotary damper attached to the gear that attempts to control retraction speed by controlling the rotation speed of the pulley.

Existing cable retractors provide at most limited control over the speed at which the cable is retracted. What is needed is an effective adjustable speed control for a cable retractor that is easily adjustable to be usable with a variety of cable types.

SUMMARY OF THE INVENTION

The present invention is a speed control for a cable retractor. In one or more embodiments the cable retractor with which the speed control is used comprises a pulley that engages a cable that may be extended and retracted. A friction element configured to adjustably contact the cable adjacent to the pulley is attached to a movable linkage. In one or more embodiments, the movement of the linkage is constrained to move along a predetermined path such that movement of the linkage along the path alters the distance between the friction element and the pulley. In one or more embodiments a cantilevered spring is attached to the linkage. An adjustable control, for example a thumbscrew, is configured to move the spring in relation to the linkage in a manner that alters the position of the friction element with respect to the cable and/or the pressure exerted by the friction element on the cable. In one or more embodiments, the friction element comprises a one-way bearing that exerts a greater amount of friction on the cable when the cable retracts than when it is extended.

BRIEF DESCRIPTION OF THE DRAWINGS

The present invention may be better understood, and its features made apparent to those skilled in the art by referencing the accompanying drawings.

FIG. 19 is a perspective view of an embodiment of a thumb nut detent mechanism present invention.

FIG. 20 is a perspective view of an embodiment of a thumb nut detent mechanism present invention.

FIG. 21 is a perspective view of an embodiment of a thumb nut detent mechanism present invention.

The use of the same reference symbols in different drawings indicates similar or identical items.

DETAILED DESCRIPTION OF THE INVENTION

Figure 1:
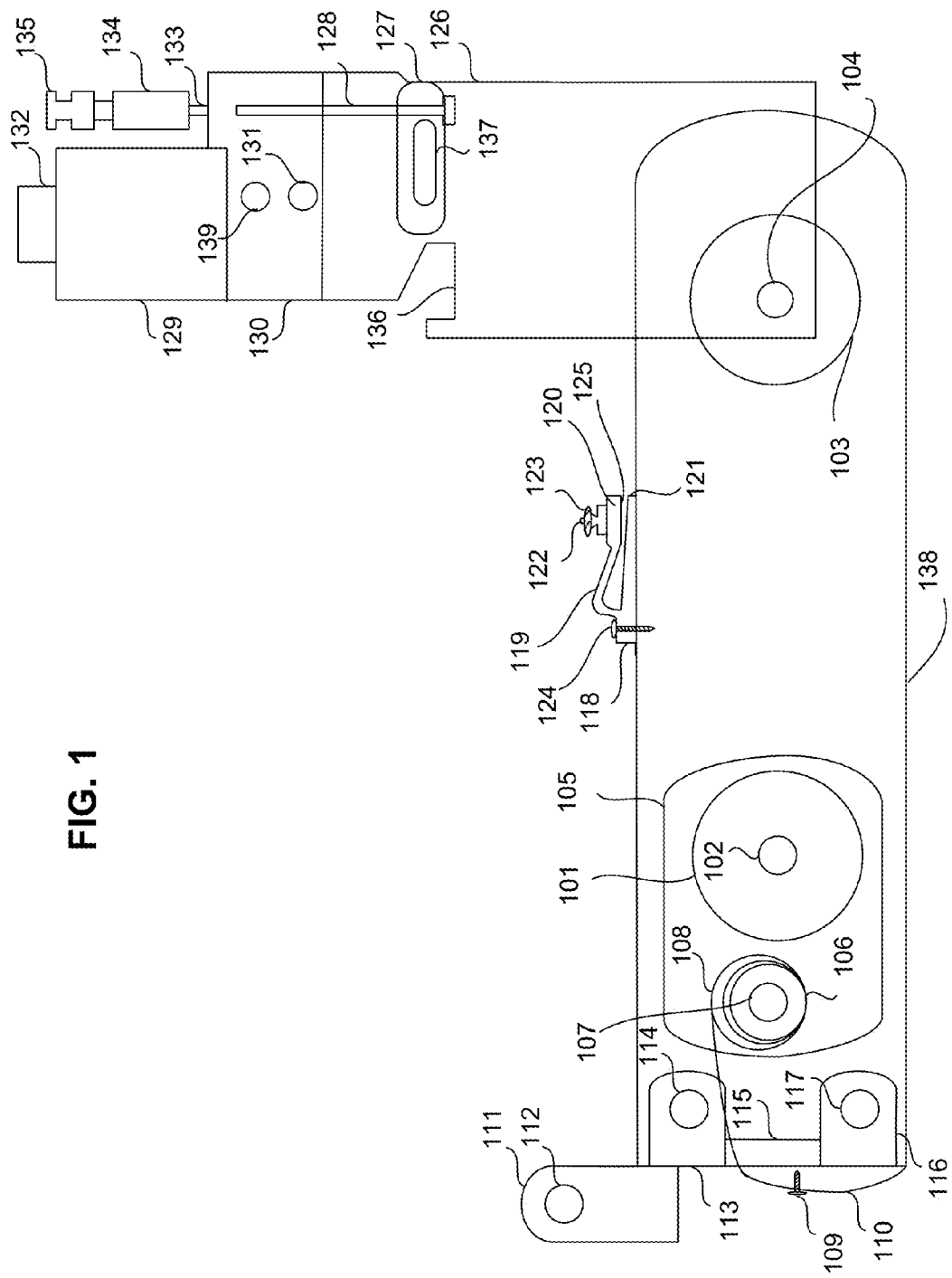
FIG. 1. is a cross sectional drawing illustrating a cable retractor with which the present invention may be used.

FIG. 1 is a cross sectional drawing illustrating a cable retractor that can be used with one or more embodiments of the speed control of the invention. The cable retractor of FIG. 1 comprises an articulate housing assembly comprising a cable stop housing 126 and a pulley housing 138. Cable stop housing 126 is pivotably coupled to pulley housing 138 such that cable stop housing 126 and pulley housing 138 can be rotated with respect to each other about an axis, for example, the first pulley axle 104 of first pulley set 103. Alternatively, a different axis than first pulley axle 104 of first pulley set 103 may be used to pivotably couple cable stop housing 126 to pulley housing 138.

A cable stop assembly 129 comprising a cable stop mechanism is coupled to the cable stop housing 126. Cable stop assembly 129 comprises a cable stop actuator button 132, which may be used to release the cable stop assembly 129 from frictionally detaining a cable 133 routed through cable stop assembly 129. When the cable stop assembly is released, the cable retractor exerts a motive force on cable 133 to retract cable 133 into the articulate housing. A cable stop collar 134 may be attached to cable 133 to prevent cable connector 135 from being pulled into contact with cable stop assembly 129.

Figure 5:
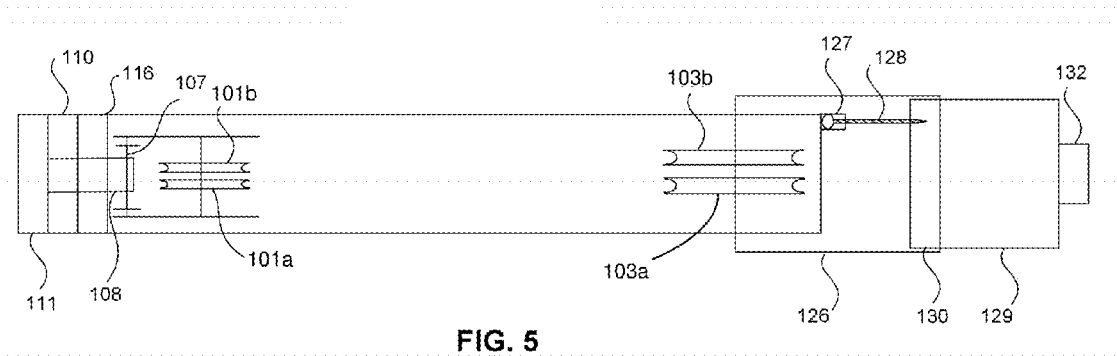
FIG. 5 is a cross sectional drawing illustrating the cable retractor of FIG. 1.

A first pulley assembly comprising first pulley set 103 and first pulley axle 104 are disposed within pulley housing 138. First pulley set 103 includes one or more pulleys that rotate independently of each other mounted to a common axle, such as, for example, first pulley axle 104. In one or more embodiments, first pulley set 103 includes a pair of pulleys 103a and 103b, as shown in FIG. 5. A second pulley assembly 105 comprising second pulley set 101, second pulley axle 102, spring 108, spring axle 107, and spring hub 106 is also disposed within pulley housing 138. Second pulley set 101 includes one or more pulleys that rotate independently of each other mounted to a common axle, such as, for example, second pulley axle 102. In one or more embodiments, second pulley set 101 includes a pair of pulleys 101a and 101b, as shown in FIG. 5.

Spring 108 is a constant force spring which exerts an approximately constant amount of force regardless of how far spring 108 has been extended or retracted within its working range of motion. Spring 108 may be a coiled flat spring which is coiled around spring axle 107, allowing spring 108 to unwind around spring hub 106 while spring 108 is being extended and to wind back around spring axle 107 as spring 108 is being retracted.

Spring 108 is connected to end cap 115 by spring mounting screw 109. Thus, second pulley assembly 105 is drawn closer to end cap 115 when spring 108 is relaxed and wound around spring axle 107 and is farther from end cap 115 when spring 108 is extended and unwound from spring axle 107. Spring 108 urges second pulley assembly 105 away from the first pulley assembly comprising first pulley set 103.

End cap 115 comprises first end cap lug 113, second end cap lug 116, and mounting lug 111. A first end cap lug aperture 114 is defined in first end cap lug 113. As second end cap lug aperture 117 is defined in second end cap lug 116. A screw is inserted through pulley housing 138 and first end cap lug aperture 114 to secure the end cap 115 to the pulley housing 138. Another screw is inserted through pulley housing 138 and second end cap lug aperture 117 to secure the end cap 115 to the pulley housing 138. Mounting lug 111 defines mounting lug aperture 112. A rod or fastener may be inserted through mounting lug aperture 112 to secure the cable retractor to a cable access enclosure.

The cable retractor may further comprise a cable clamp assembly 118. Cable clamp assembly 118 is attached, for example, to pulley housing 138 using cable clamp mounting screw 124. Cable clamp assembly 118 comprises cable clamp flexure 119, cable clamp movable engagement portion 120, and cable clamp fixed engagement portion 121, where cable clamp flexure 119 allows cable clamp movable engagement portion 120 to be moved relative to cable clamp fixed engagement portion 121 to allow cable 133 to be installed in or removed from cable clamp aperture 125 defined between cable clamp movable engagement portion 120 and cable clamp fixed engagement portion 121. A cable clamp threaded stud 122 engages cable clamp fixed engagement portion 121. For example, cable clamp threaded stud 122 may be screwed into or molded into cable clamp fixed engagement portion 121. Cable clamp threaded stud 122 extends through an aperture defined in cable clamp movable engagement portion 120 beyond which cable clamp nut 123 engages cable clamp threaded stud 122. Cable clamp nut 123 may be rotated to increase or decrease the spacing of cable clamp aperture 125, thereby decreasing or increasing, respectively, the pressure applied by cable clamp fixed engagement portion 121 and cable clamp movable engagement portion 120 on the portion of cable 133 occupying cable clamp aperture 125. By using cable clamp nut 123 to decrease the pressure on the portion of cable 133 occupying cable clamp aperture 125, that portion of cable 133 may be removed from cable clamp aperture 125, and another cable 133 may be inserted in place thereof. Cable clamp assembly 118 is separable from the pulley housing to facilitate installation of cable 133.

Figure 2:
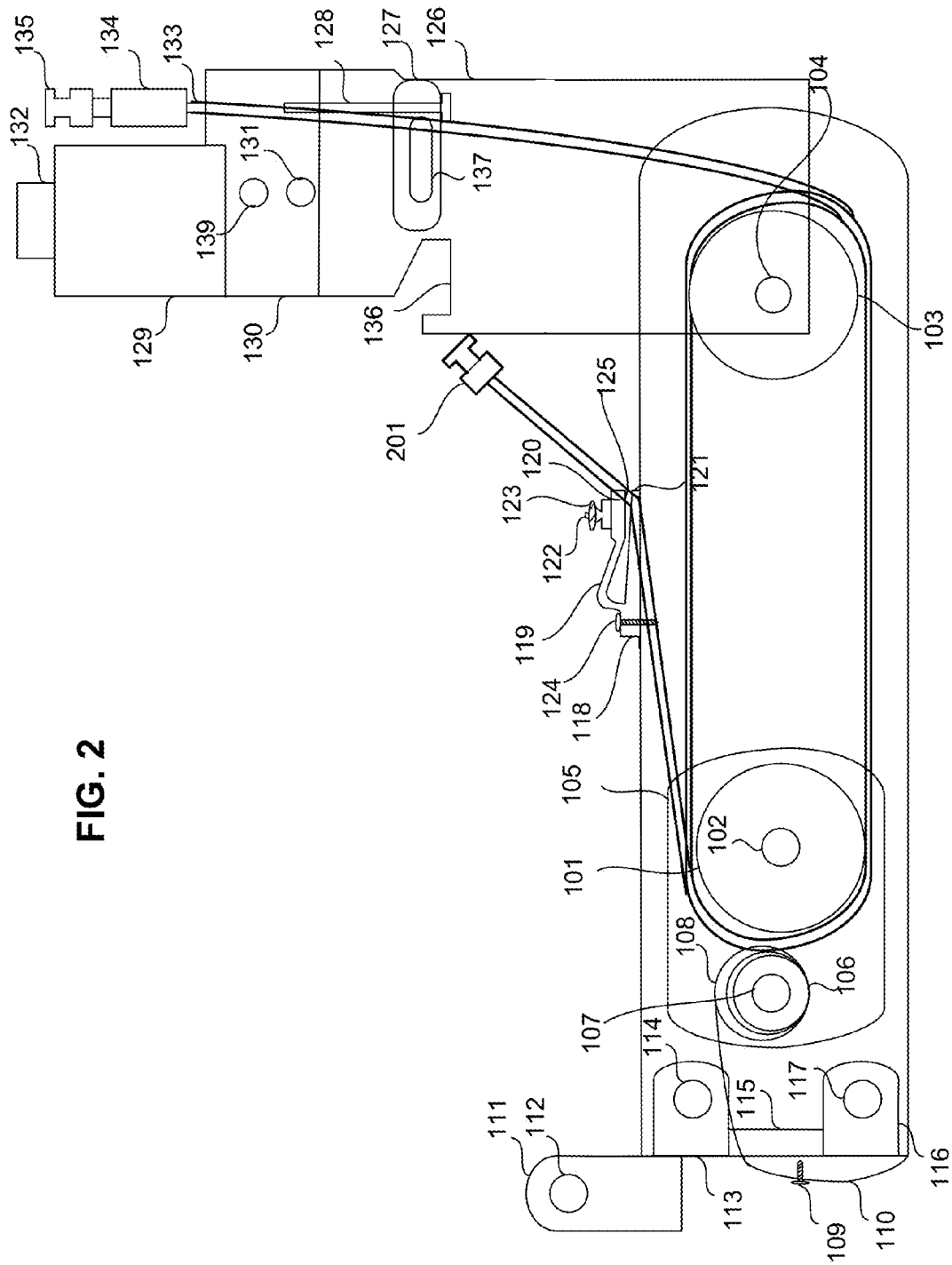
FIG. 2 is a cross sectional drawing illustrating the cable retractor of FIG. 1 with a cable installed.

FIG. 2 is a cross sectional drawing illustrating the cable retractor of FIG. 1 with a cable installed. A cable stop collar 134 is attached near connector 135 at one end of cable 133. Cable 133 is installed within cable stop assembly 129. Cable stop assembly 129 operably frictionally engages a first portion of cable 133. Cable 133 extends toward first pulley set 103, where a first pulley 103a of first pulley set 103 operably engages a second portion of cable 133 around a first portion of a first circumferential surface of first pulley 103a. Cable 133 extends toward second pulley set 101, where second pulley 101a of second pulley set 101 operably engages a third portion of cable 133 around a first portion of a second circumferential surface of second pulley 101a. From second pulley 101a, cable 133 extends toward third pulley 103b of first pulley set 103, where third pulley 103b operably engages a fourth portion of cable 133 around a circumferential surface of third pulley 103b. From third pulley 103b, cable 133 extends toward fourth pulley 101b of second pulley set 101, where fourth pulley 101b operably engages a fifth portion of the cable around a circumferential surface of fourth pulley 101b. From fourth pulley 101b, cable 133 extends to cable clamp assembly 118, where cable clamp assembly 118 operably frictionally engages a sixth portion of cable 133. From cable clamp assembly 118, cable 133 extends to cable connector 201 at a second end of cable 133 opposite the end of cable 133 where cable connector 135 is attached.

The second portion of cable 133 lies between the first portion of cable 133 and the third portion of cable 133 along the length of cable 133. The third portion of cable 133 lies between the second portion of cable 133 and the fourth portion of cable 133 along the length of cable 133. The fourth portion of cable 133 lies between the third portion of cable 133 and the fifth portion of cable 133 along the length of cable 133. The fifth portion of cable 133 lies between the fourth portion of cable 133 and the sixth portion of cable 133 along the length of cable 133.

Figure 3:
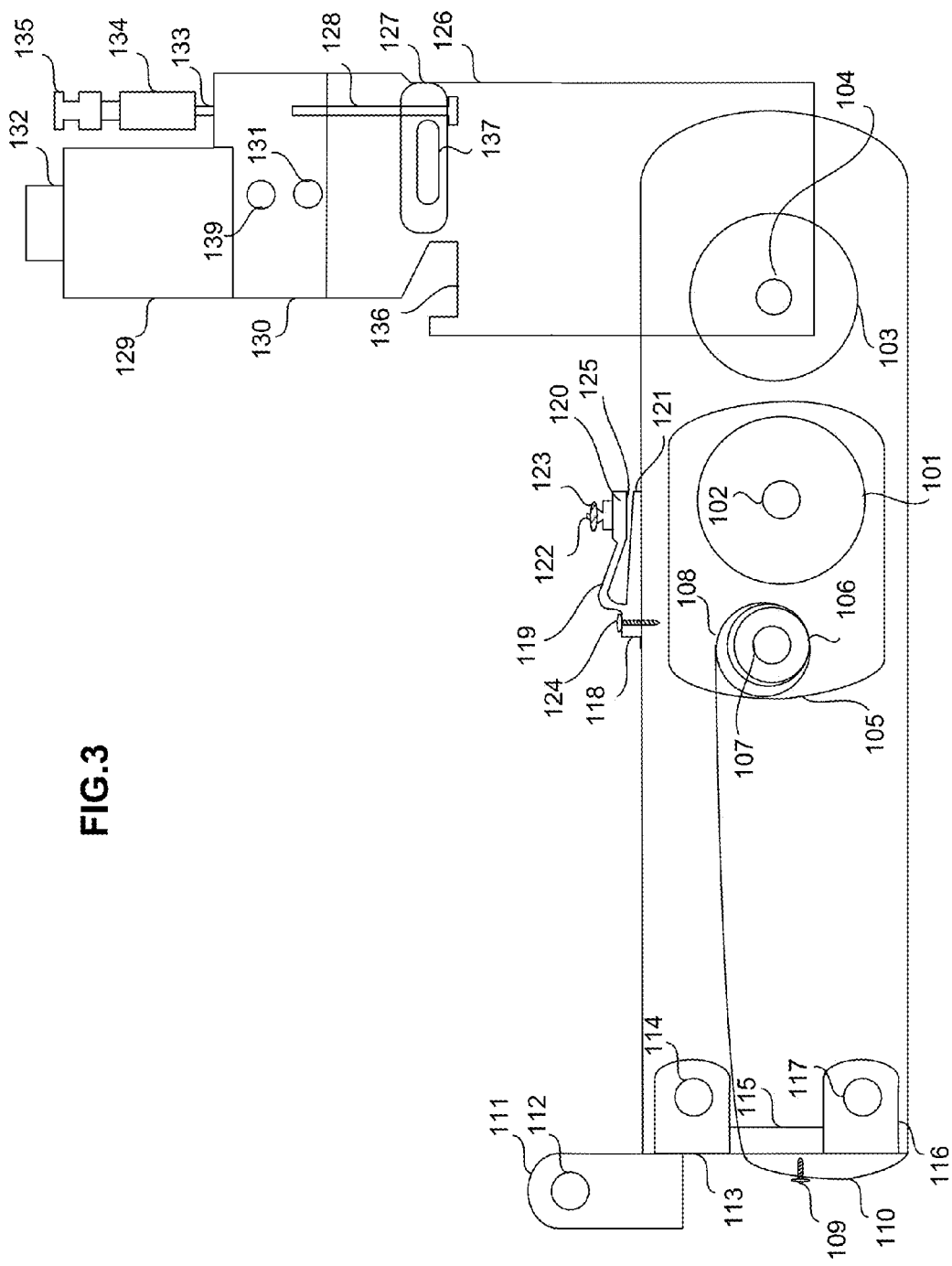
FIG. 3 is a cross sectional drawing illustrating the cable retractor of FIG. 1 with its spring extended.

FIG. 3 is a cross sectional drawing illustrating the cable retractor of FIG. 1 with its spring extended. With spring 108 extended, second pulley assembly 105 is translated linearly and radially with respect to first pulley set 103, such that second pulley set 101 is closer to first pulley set 103 than when spring 108 is retracted. As spring 108 is extended, a straightened portion of spring 108 extends between second pulley assembly 105 and spring mounting block 110 of end cap 115. As spring 108 is retracted, that straightened portion of spring 108 is wound around spring axle 107, with the remainder of spring 108 around spring axle 107 rotating about spring axle 107 to accommodate the winding of the straightened portion of spring 108.

Figure 4:
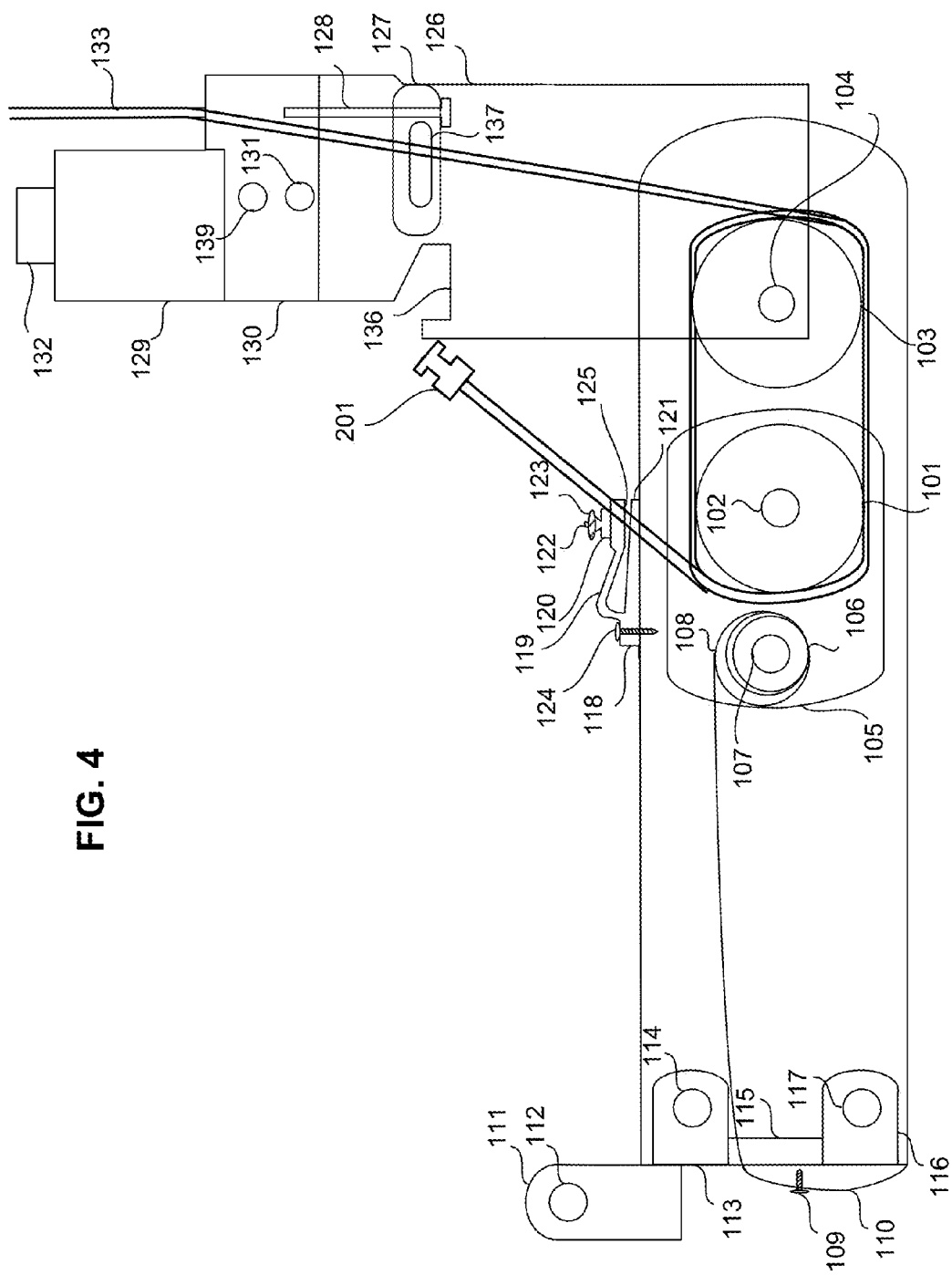
FIG. 4 is a cross sectional drawing illustrating the cable retractor of FIG. 1 with its spring extended and with a cable installed.

FIG. 4 is a cross sectional drawing illustrating the cable retractor of FIG. 1 with its spring extended and with a cable installed. FIG. 4 illustrates the elements shown in FIG. 2, with cable 133 installed, but with spring 108 extended. Cable 133 has been rotated about first pulley set 103 and second pulley set 101 to bring second pulley set 101 closer to first pulley set 103, reducing the lengths of cable 133 between first pulley 103 set and second pulley 101 set. The motive force for such reconfiguration of the cable retractor is provided by pulling on cable stop collar 134 so as to draw a portion of cable 133 extending from cable stop collar 134 out of the cable retractor. After that portion of cable 133 is withdrawn from the cable retractor, cable stop assembly 129 operates to frictionally retain cable 133 until cable stop actuator button 132 is depressed.

When cable stop actuator button 132 is depressed, cable stop assembly 129 allows the extended portion of cable 133 to be retracted into the cable retractor. The motive force for the retraction is provided by spring 108 acting on second pulley assembly 105 to draw second pulley set 101 farther from first pulley set 103, thereby increasing the lengths of cable 133 between first pulley set 103 and second pulley set 101.

FIG. 5 illustrates the cable retractor of FIG. 1 as viewed from an angle ninety degrees from the angle of view of FIG. 1.

Figure 6:
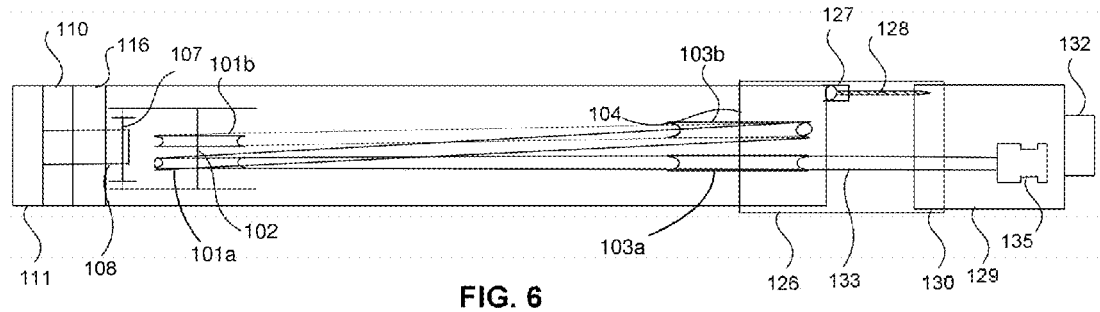
FIG. 6 is a cross sectional drawing illustrating the cable retractor of FIG. 1 with a cable installed.

FIG. 6 illustrates the cable retractor of FIG. 2, with cable 133 installed, as viewed from an angle ninety degrees from the angle of view of FIG. 2.

Figure 7:
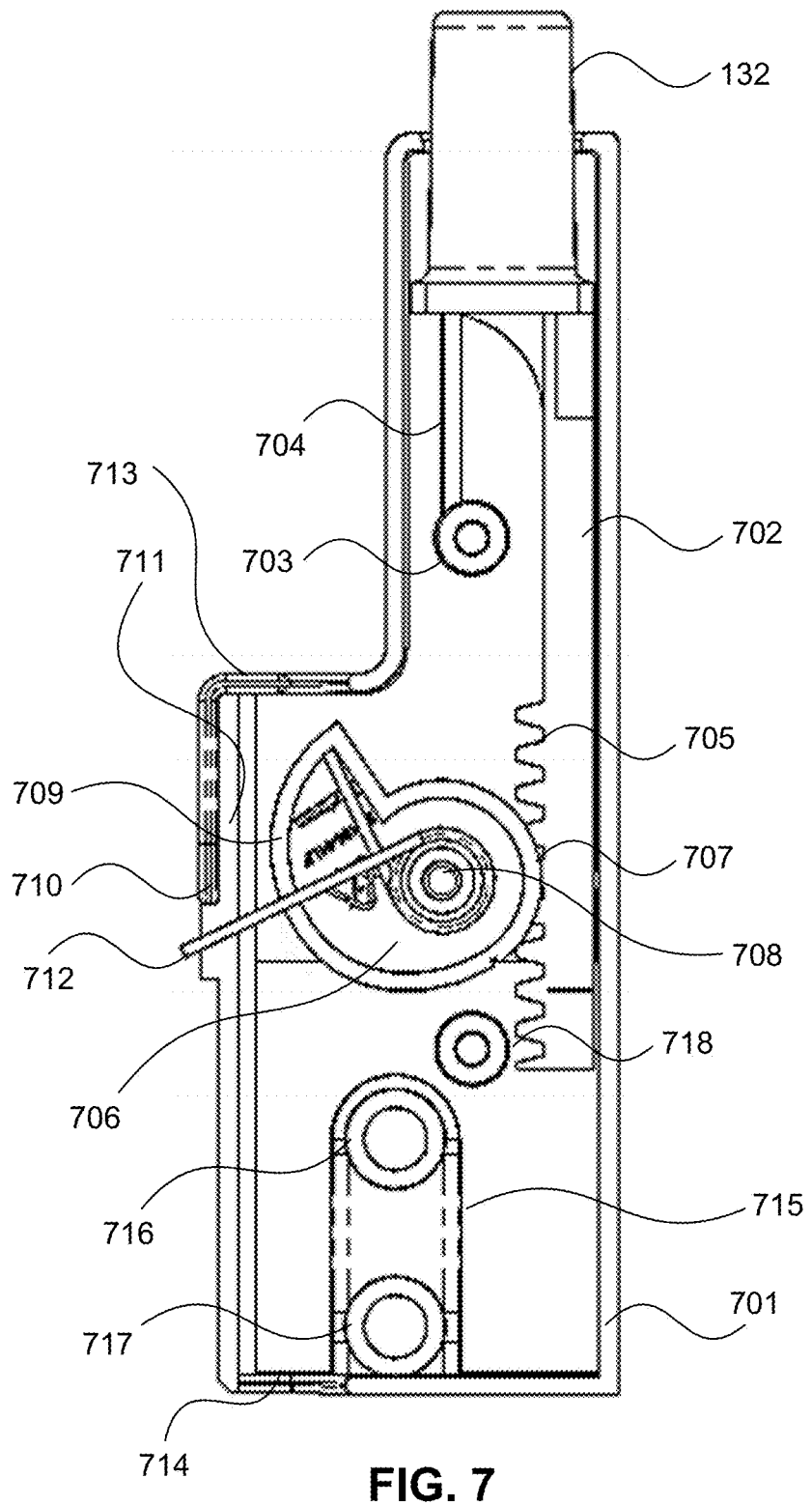
FIG. 7 is a cross sectional drawing illustrating a cable stop assembly of the cable retractor of FIG. 1.

FIG. 7 is a cross sectional drawing illustrating cable stop assembly 129 of the cable retractor of FIG. 1. Cable stop assembly 129 comprises cable stop assembly housing 701, cable stop actuator 702, cable stop actuator button 132, upper cable stop assembly screw boss 703, cable stop actuator guide 704, cable stop actuator rack gear teeth 705, cable stop cam 706, cable stop cam pinion gear teeth 707, cable stop axle 708, cable stop cam engagement surface 709, cable stop spring 712, lower cable stop assembly screw boss 718. Cable stop spring 712 is coiled around cable stop axle 708. Cable stop assembly housing 701 comprises cable stop cam base 710, which defines cable stop cam base engagement surface slot 711. A tab defined in cable stop housing 126 projects into cable stop cam base engagement surface slot 711 to provide a cable stop cam base engagement surface so that a cable 133 can be positioned between the tab and cable stop cam engagement portion 709 of cable stop cam 706. When cable stop assembly housing 701 is disassembled from cable stop housing 126, cable stop cam base engagement surface slot 711 provides space for a cable 133 to be removed from and/or installed into cable stop assembly housing 701. Cable stop assembly housing 701 defines upper cable aperture 713 and lower cable aperture 714 to allow cable 133 to be inserted through cable stop cam base engagement surface slot 711 adjacent to cable stop cam engagement surface 709. Cable stop actuator 702 transfers the force via cable stop actuator rack gear teeth 705 and cable stop cam pinion gear teeth 707 to cable stop cam 706. Cable stop cam engagement surface 709 of cable stop cam 706 exerts force against the portion of cable 133 located between cable stop cam engagement surface 709 and the tab of cable stop 126 that fills cable stop cam base engagement portion surface slot 711, which frictionally detains cable 133, preventing cable 133 from being retracted into the cable retractor. When cable stop actuator button 132 is depressed, cable stop actuator rack gear teeth 705 operate on cable stop cam pinion gear teeth to move cable stop cam 706 so that cable stop cam engagement surface 709 moves away from the portion of cable 133 detained in cable stop assembly 129, reducing the friction with which that portion of cable 133 is detained, thereby allowing cable 133 to be retracted into the cable retractor. Such retraction can continue until cable stop collar 134 contacts cable stop assembly housing 701 or until cable stop actuator button 132 is released. As cable stop actuator button 132 is depressed, cable stop spring 712 is wound around cable stop axle 708. Cable stop spring 712 exerts force through cable stop cam pinion gear teeth 707 and cable stop actuator rack gear teeth 705 to bias cable stop actuator 702 and cable stop actuator button 132 upward (i.e., toward a released position). As cable stop actuator button 132 is released, cable stop spring 712 is unwound somewhat, relaxing somewhat the force it had applied to cable stop actuator button 132. Cable stop collar 134 is configurable to abut a portion of cable stop assembly housing 701 to limit cable retraction. Alternatively, cable stop actuator spring 712 may be implemented as, for example, a spring between cable stop actuator button 132 and a portion of cable stop assembly housing 701, such as cable stop assembly screw base 703, as a spring between cable stop actuator 702 and cable stop assembly housing 701, as a spring between cable stop cam 706 and cable stop assembly housing 701, or in other similar configurations.

Cable stop assembly housing 701 further comprises cable stop assembly boss 715, which defines upper cable stop assembly screw collar 716 and lower cable stop assembly screw collar 717, which define holes for cable stop assembly screws 139 and 131, respectively. As noted, cable stop assembly housing 701 comprises upper cable stop assembly screw boss 703 and lower cable stop assembly screw boss 718. Screws engaging upper cable stop assembly screw boss 703 and lower cable stop assembly screw boss 718 can be used to hold cable stop assembly housing 701 together.

Figure 8:
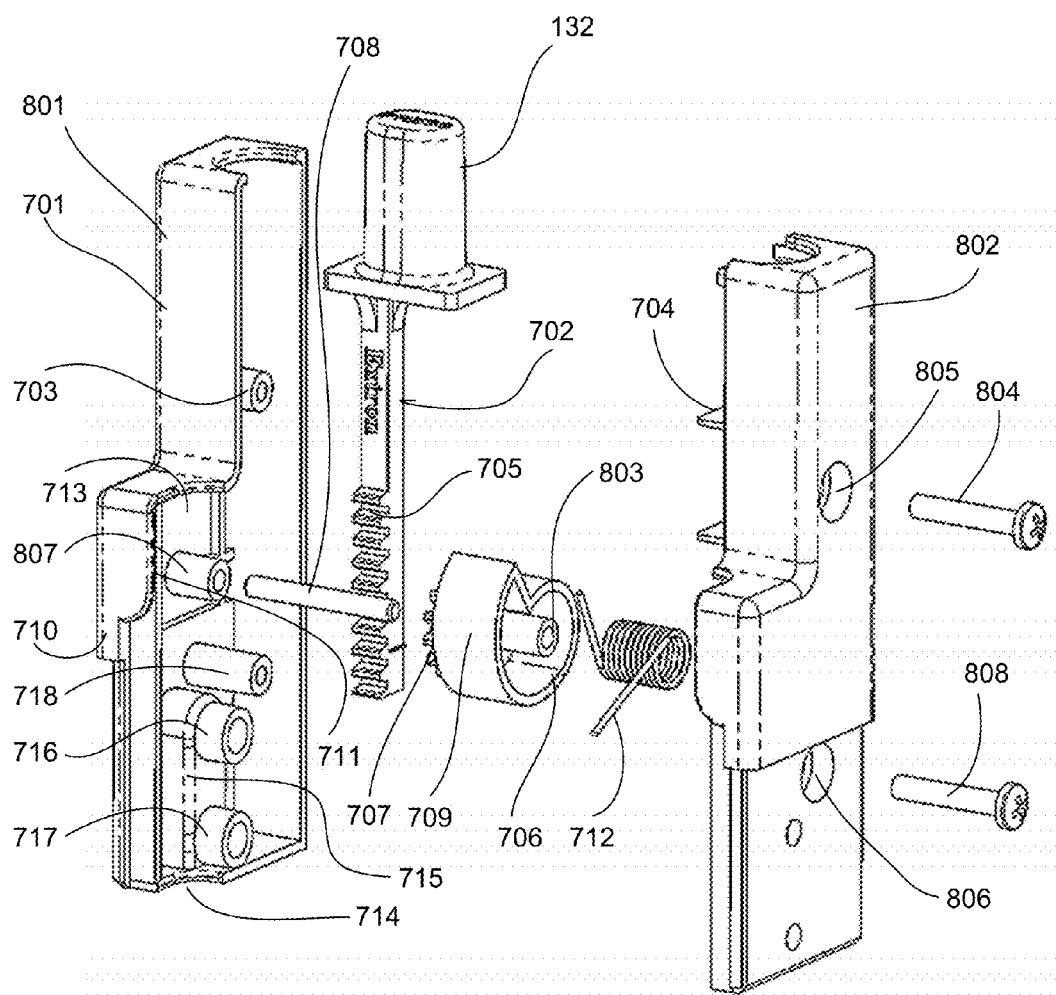
FIG. 8 is an exploded perspective drawing illustrating the cable stop assembly of FIG. 7.

FIG. 8 is an exploded perspective drawing illustrating cable stop assembly 129. Cable stop assembly 129 comprises cable stop assembly housing 701, which comprises portions 801 and 802. Portions 801 and 802 can receive components of cable stop assembly and be assembled to form cable stop assembly 129. Cable stop cam 706 comprises cable stop cam sleeve 803, which surrounds cable stop axle 708 and is surrounded by the coiled portion of cable stop spring 712. Portion 801 of cable stop assembly 701 comprises cable stop axle boss 807, which coaxially retains cable stop axle 708 in position within cable stop assembly housing 701. Portion 801 of cable stop assembly housing 701 comprises upper cable stop assembly screw boss 703 and lower cable stop assembly screw boss 718. Portion 802 of cable stop assembly housing 701 defines upper hole 805 and lower hole 806. With the components enclosed within cable stop assembly housing 701 installed therein, portions 801 and 802 can be assembled together. When so assembled, upper hole 805 of portion 802 aligns with upper cable stop assembly screw boss 703 and lower hole 806 aligns with lower cable stop assembly screw boss 718. Upper screw 804 can be installed through upper hole 805 to engage upper cable stop assembly screw boss 703 and lower screw 808 can be installed through lower hole 806 to engage lower cable stop assembly screw boss 718, thereby fastening together portions 801 and 802 of cable stop assembly housing 701.

Figure 9A:
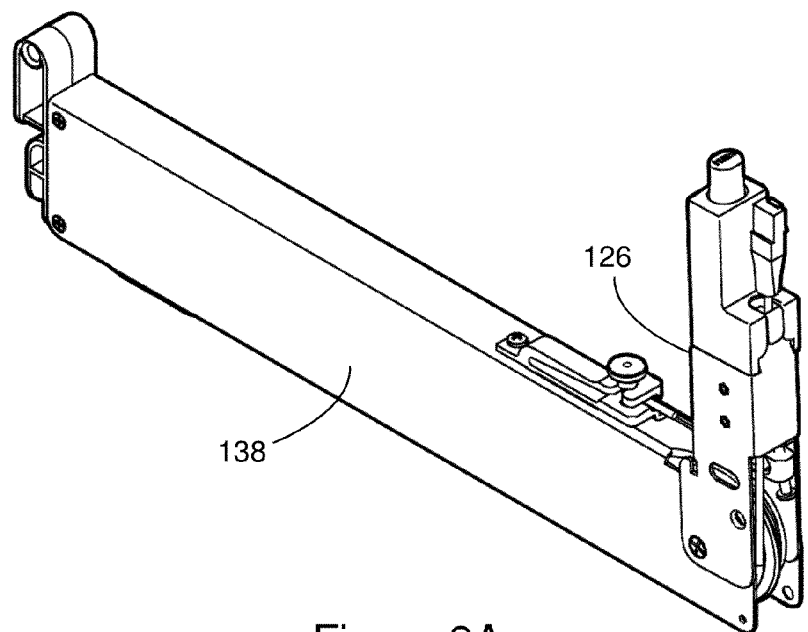
FIGS. 9A-9D are perspective views showing configurations of the cable retractor of FIG. 1.
Figure 9B:
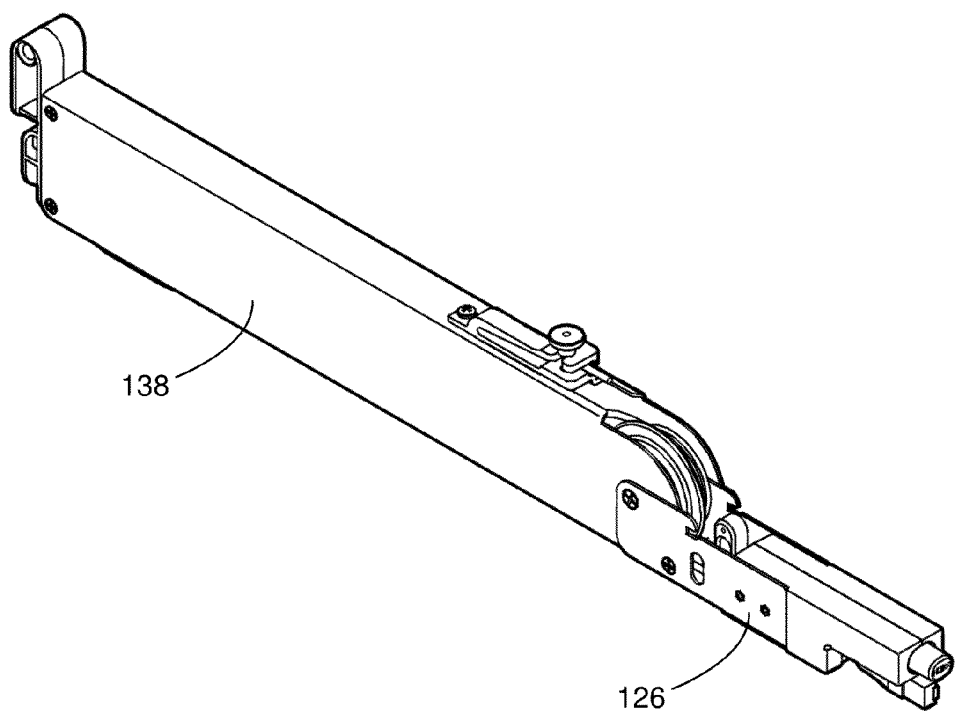
Figure 9C:
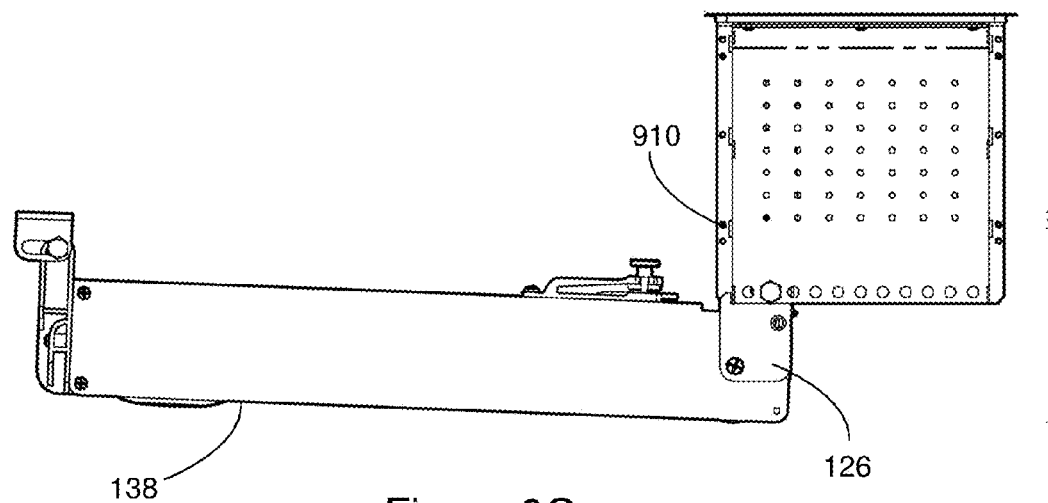
Figure 9D:
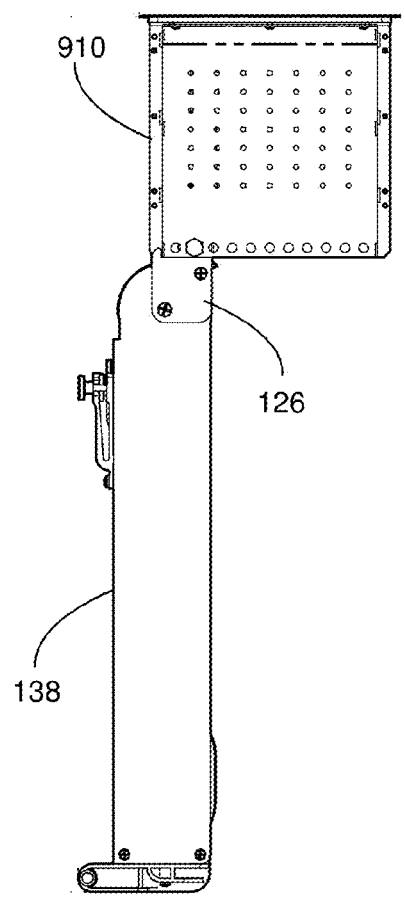

FIGS. 9A to 9D are perspective views showing configurations of the cable retractor of FIG. 1. FIG. 9A shows the cable retractor configured such that cable stop housing 126 is pivoted with respect to pulley housing 138. FIG. 9B shows the cable retractor configured such that cable stop housing 126 is pivoted to be inline with pulley housing 138. FIG. 9C shows the cable retractor configured as in FIG. 9A mounted to a cable access enclosure 910, which may, for example, be a "Cable Cubby" manufactured by RGB Systems, Inc. FIG. 9D shows the cable retractor configured as in FIG. 9B mounted to cable access enclosure 910.

Figure 10:
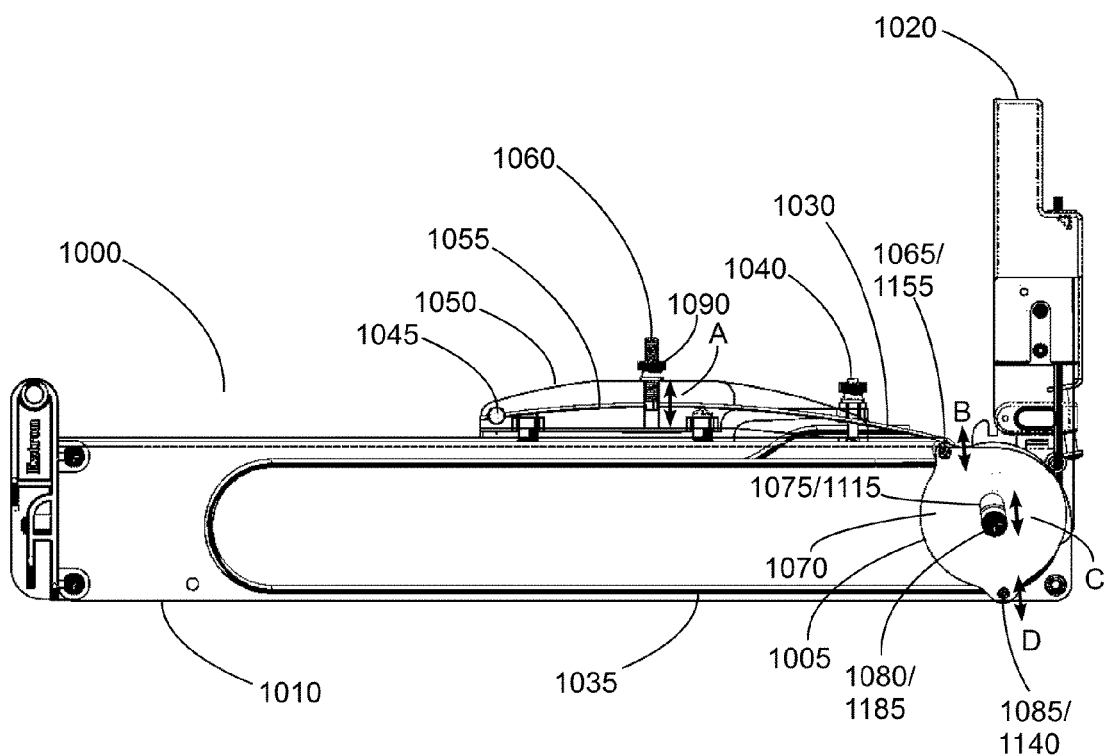
FIG. 10 is a cross-sectional view of an embodiment of the speed control of the present invention.
Figure 11:
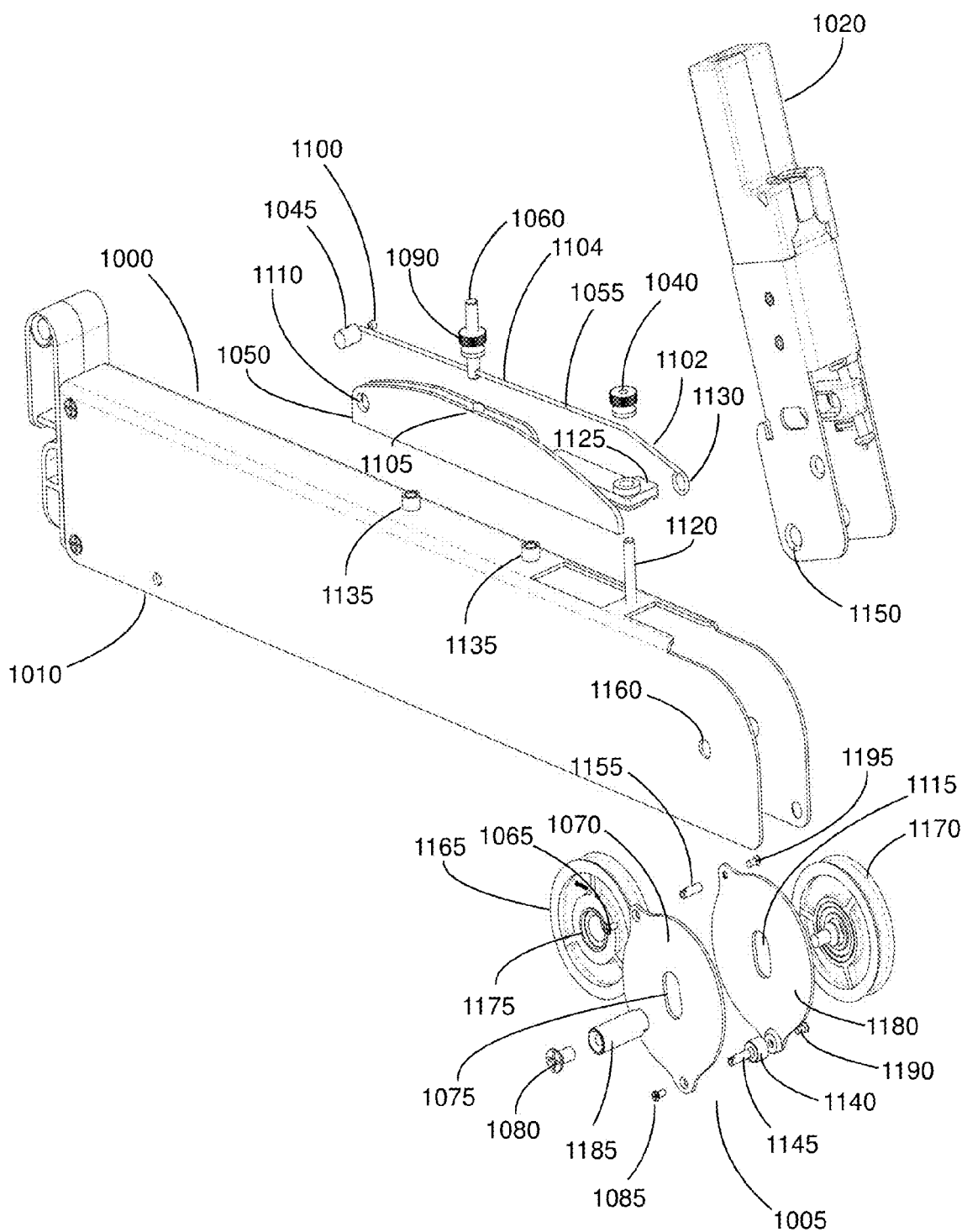
FIG. 11 is an exploded view of an embodiment of the speed control of the present invention.

FIGS. 10 and 11 show an embodiment of the speed control of the present invention. FIG. 10 is a cutaway view showing an embodiment of the speed control of the present invention. FIG. 11 is an exploded view of the speed control embodiment of FIG. 10. Some of the components shown in FIG. 11 are not visible in FIG. 10.

FIGS. 10 and 11 show the speed control of the present invention installed in a cable retractor 1000. Cable retractor 1000 includes pulley housing 1010 and cable stop housing 1020. The side of pulley housing 1010 has been rendered transparent in FIG. 10 such that certain internal components are visible. Only some of the internal components of cable retractor 1000 are shown so as to not obscure the speed control of the present invention. For example, the spring biased pulley assembly that provides for retraction and extension of cable 1035 (such as, for example, pulley assembly 105 of the embodiment of FIG. 1) is not shown in FIG. 10.

In the embodiment of FIGS. 10 and 11, components of the speed control include a bracket 1050, a drag assembly 1005, and a spring 1055.

Bracket 1050, which may be formed from a plastic, metal, or any other suitable material, is configured to be mountable to pulley housing 1010, for example via screws attaching bracket 1050 to mounting bosses 1135 (shown in FIG. 11).

Drag assembly 1005 is configured to exert an adjustable amount of friction on cable 1035 as cable 1035 is retracted into pulley housing 1010 so as to control the retraction speed. In one or more embodiments, drag assembly 1005 is configured to be mountable adjacent to a pulley set of cable retractor 1000, such as, for example, pulley set 103 of the embodiment of FIG. 1. In the embodiment of FIGS. 10 and 11, drag assembly 1005 comprises two end plates 1070 and 1180 that are kept spaced apart by posts 1145 and 1155. Posts 1145 and 1155 are fastened to endplates 1070 and 1180 by fasteners 1065, 1085, 1190, and 1195, which may, for example, comprise screws or other threaded fasteners that engage mating threaded holes in posts 1145 and 1155. Endplates 1070 and 1180 can be made of metal, plastic, composite, or any other suitable material. In the embodiment of FIGS. 10 and 11, endplates 1070 and 1180 include elongated oval slots 1075 and 1115, respectively, that are configured to accept pulley axle 1185. Posts 1145 and 1155 are dimensioned so as to allow at least one pulley 1165 of a pulley set of cable retractor 1000 to be sandwiched between endplates 1070 and 1180 when pulley 1165 is mounted to pulley axle 1185 via pulley bearing 1175 and drag assembly 1005 is mounted to pulley axle 1185 via slots 1075 and 1115. In the embodiment of FIGS. 10 and 11, a one-way bearing 1140 is mounted to post 1145 between endplates 1070 and 1180.

In the embodiment of FIGS. 10 and 11, drag assembly 1005, pulley axle 1185, and pulleys 1165 and 1170 are configured to fit between the sidewalls of pulley housing 1010. In one or more embodiments, drag assembly 1005 and pulleys 1165 and 1170 are mounted to pulley axle 1185, and the resulting assembly is fastened to pulley housing 1010 and cable stop housing 1020 via a fastener 1080 (which may be a screw) inserted through hole 1150 of cable stop housing 1020 and hole 1160 of pulley housing 1010 such that it engages a mating threaded hole in pulley axle 1185. In one or more embodiments, a second fastener is inserted through holes in opposite sides of cable stop housing 1020 and pulley housing 1010 to engage a second threaded hole in the opposite side of pulley axle 1185. In the resulting assembly, cable stop housing 1020 and pulleys 1165 and 1170 are all pivotably attached to pulley housing 1010 via pulley axle 1185. In alternate embodiments, cable stop housing 1020 and pulleys 1165 and 1170 may be configured to rotate about different axes.

In one or more embodiments, cantilever spring 1055 is formed from a length of spring wire or flat spring ribbon. In the embodiment shown in FIG. 11, cantilever spring 1055 is formed from a length of spring wire, and includes a loop 1130 formed at one end, a bent portion 1102 adjacent to loop 1130, and a straight portion 1104. Straight portion 1104 of cantilever spring 1055 is attached to bracket 1050 by pivot pin 1045 that engages hole 1110 in bracket 1050. In one or more embodiments, pivot pin 1045 has a hole through which the end of cantilever spring 1055 may be inserted, and a set screw 1100 that is configured to lock cantilever spring 1055 in position in pivot pin 1045. Loop 1130 of cantilever spring 1055 is attached to drag assembly 1005 via post 1155. In one or more embodiments, a threaded post 1060 with a hole at a bottom end is mounted to straight portion 1104 of cantilever spring 1055. Threaded post 1060 is configured to engage a mating opening 1105 in bracket 1050 when cantilever spring 1055 is attached to bracket 1050. A thumb nut 1090 is disposed on threaded post 1060. Thumb nut 1090 may be threaded onto threaded post 1060 until its underside engages bracket 1050 adjacent to opening 1105. Further tightening of thumb nut 1090 on threaded post 1060 causes straight portion 1104 of cantilever spring 1055 to be pulled upwards in a vertical direction. Subsequent loosing of thumb nut 1090 allows straight portion 1104 of cantilever spring 1055 to be released in a downward position. Adjustment of the position of thumb nut 1090 on post 1060 adjusts the spring force exerted by loop 1130 of cantilever spring 1055 on drag assembly 1005.

In one or more embodiments, thumb nut 1090 is provided with a detent mechanism to prevent thumb nut 1090 from rotating after the desired spring force setting has been achieved. One embodiment of such a detent mechanism is shown in FIGS. 19-21. In the embodiment of FIGS. 19-20, thumbnut 1910 is provided with a series of radial ridges 2110 on its bottom face that are configured to mate with a matching set of radial ridges 2020 formed on bracket 1050 when thumbnut 1910 is mounted to threaded post 1060. In the embodiment of FIGS. 19-21, the sidewalls 1920 of bracket 1050 adjacent to opening 1105 are curved to accommodate post 1060, and radial ridges 2020 are formed on the faces of the curved portions so as to mate with radial ridges 2110 of thumb nut 1910. The embodiment of FIGS. 19-21 also includes projections 2010 formed in bracket 1050 adjacent to radial ridges 2020 to help maintain thumb nut 1910 in place during adjustment. When thumb nut 1910 has been adjusted such that loop 1130 of cantilever spring 1055 exerts a generally upward force on drag assembly 1005, cantilever spring 1055 exerts a generally downward force on post 1060 and thumb nut 1910, pressing raised ridges 2110 of thumb nut 1910 against mating raised ridges 2020 of bracket 1050, holding thumb nut 1910 in place.

Figure 12:
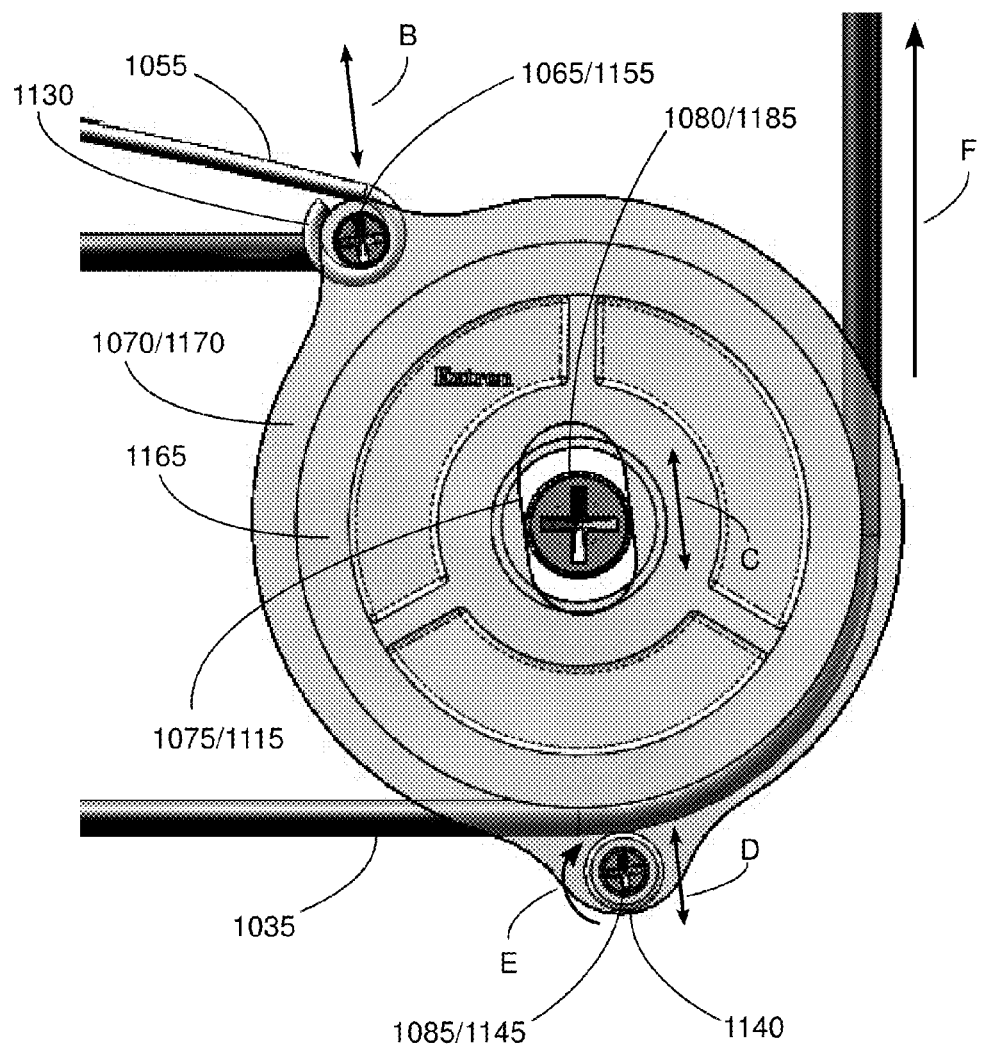
FIG. 12 is a detail view of an embodiment of the speed control of the present invention.

In the embodiment of FIGS. 10 and 11, adjustment of thumb nut 1090 up and down (arrow A in FIG. 10) translates into an adjustable amount of spring force being exerted by loop 1130 on drag assembly post 1155 of drag assembly 1005 (arrow B). As shown in FIG. 12, slots 1075 and 1115 of drag assembly 1005 restrain movement of drag assembly 1005 generally in the direction of arrow C. Drag assembly 1005 translates the spring force exerted on post 1155 by loop 1130 of cantilever spring 1055 into a force exerted by one-way bearing 1040 on cable 1035, pushing cable 1035 against pulley 1165 generally in the direction of arrow D. The cantilever configuration of cantilever spring 1055 allows one way bearing 1040 to "float" up and down in the direction of arrow D with variations in the thickness or other imperfections of cable 1035 without a great change in the amount of force exerted by one-way bearing 1140 on cable 1035 as cable 1035 is extended or retracted. The force exerted by one-way bearing 1140 on cable 1035 can be viewed as in some ways mimicking the force that would be exerted on cable 1035 by a person's finger if the finger were placed on cable 1035 during retraction or extension.

The configuration of cantilever spring 1055 and drag assembly 1005 of the embodiment of FIGS. 10-12 transforms the adjustable force that cantilever spring 1055 exerts on drag assembly 1005 into an adjustable and variable amount of friction exerted by one-way bearing 1140 on cable 1035. In the embodiment of FIG. 12, one-way bearing 1140 freely rotates in the direction of arrow E, which corresponds to extension of cable 1035 in the direction of arrow F. Because of that free rotation, little friction is exerted on cable 1035 by one-way bearing 1140 during extension of cable 1035. One-way bearing 1140 does not rotate in the opposite direction, which corresponds to retraction of cable 1035. Accordingly, the force of one-way bearing 1140 on cable 1035 creates friction that controls the retraction speed during retraction. The amount of such friction, and hence the retraction speed, can be adjusted by thumb nut 1090.

Figure 13:
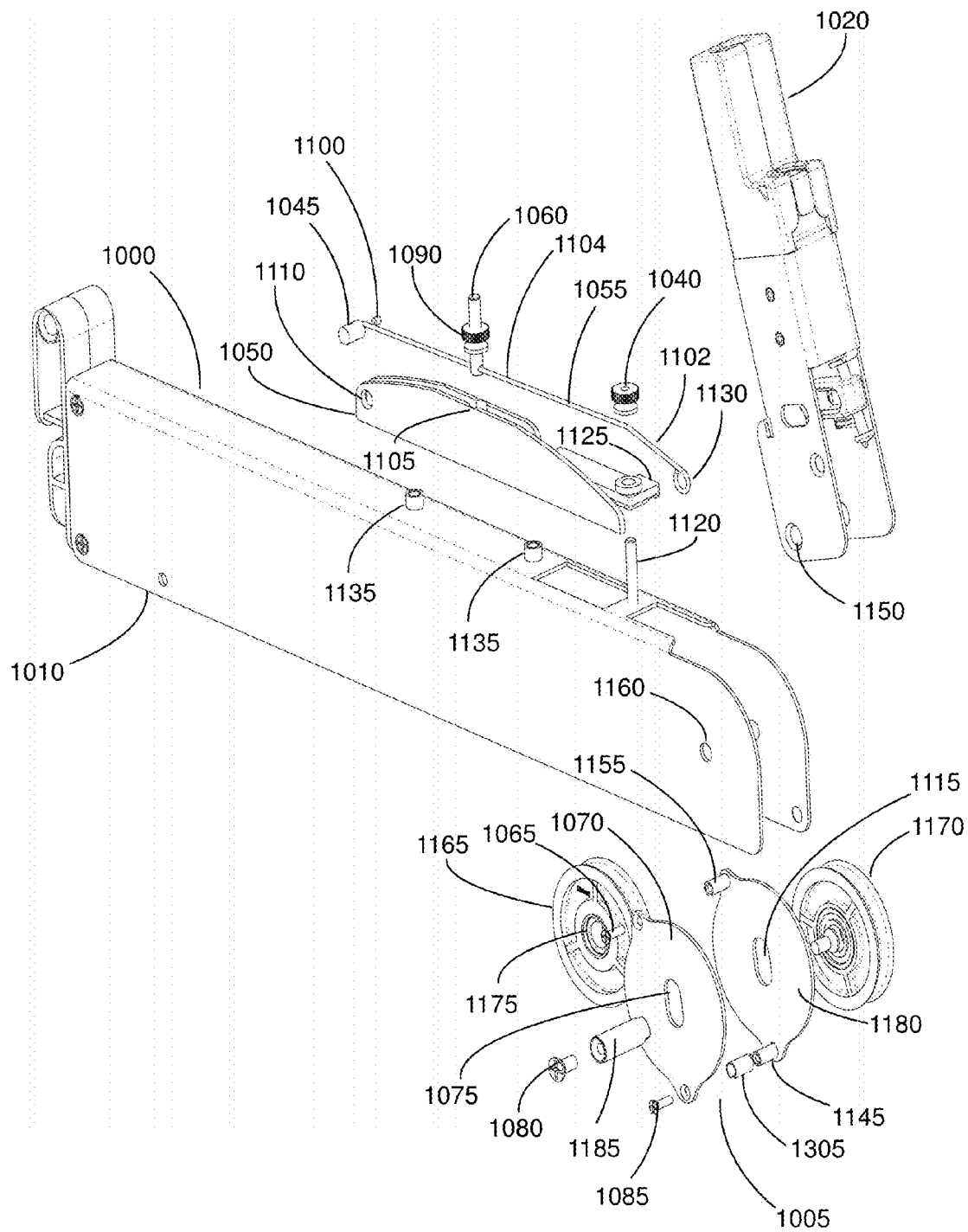
FIG. 13 is an exploded view of an embodiment of the speed control of the present invention.

FIG. 13 shows an alternate embodiment of drag assembly 1005 that does not use a one-way bearing. In the embodiment of FIG. 13, instead of the one-way bearing 1140 of the embodiment of FIGS. 10-12, a sleeve 1305 is placed over post 1145 between end plates 1070 and 1180, such that the surface of sleeve 1305 contacts the surface of cable 1035 and exerts force on cable 1035 in the same manner as the surface of one-way bearing 1140 of the embodiment of FIGS. 10-12. Sleeve 1305 may be rotatably mounted to post 1145 or may be irrotatably fixed in position. Sleeve 1305 may be made of a metal (e.g. brass, copper, aluminum, steel, etc.), a plastic (e.g. PVC, ABS, nylon, Teflon, etc.), a composite, or any other suitable material. Sleeve 1305 may be smooth or have a regular or irregular surface texture, and may, for example have a surface that produces a greater amount of contact friction in one direction than the other, or may be configured to produce approximately the same amount of contact friction in both directions. In one or more alternative embodiments, sleeve 1305 may be omitted, such that the surface of post 1145 contacts the surface of cable 1035 directly. In such embodiments, post 1145 may be made of any of the same materials described above for sleeve 1305, and may have any of the same surface features or characteristics.

Figure 14:
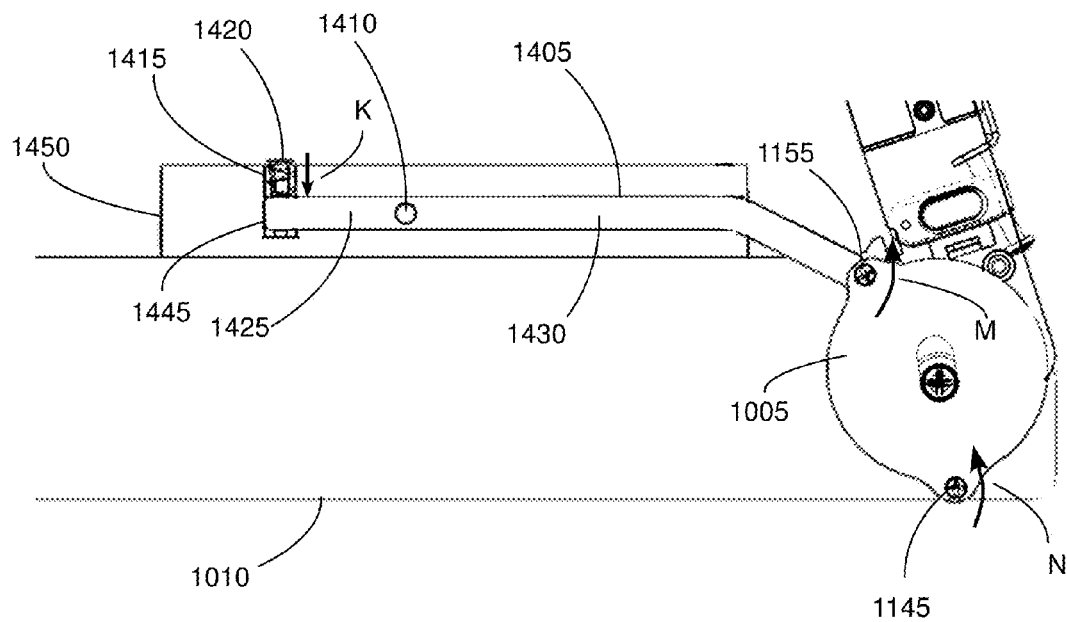
FIG. 14 is a cross-sectional view of an embodiment of the speed control of the present invention.
Figure 15:
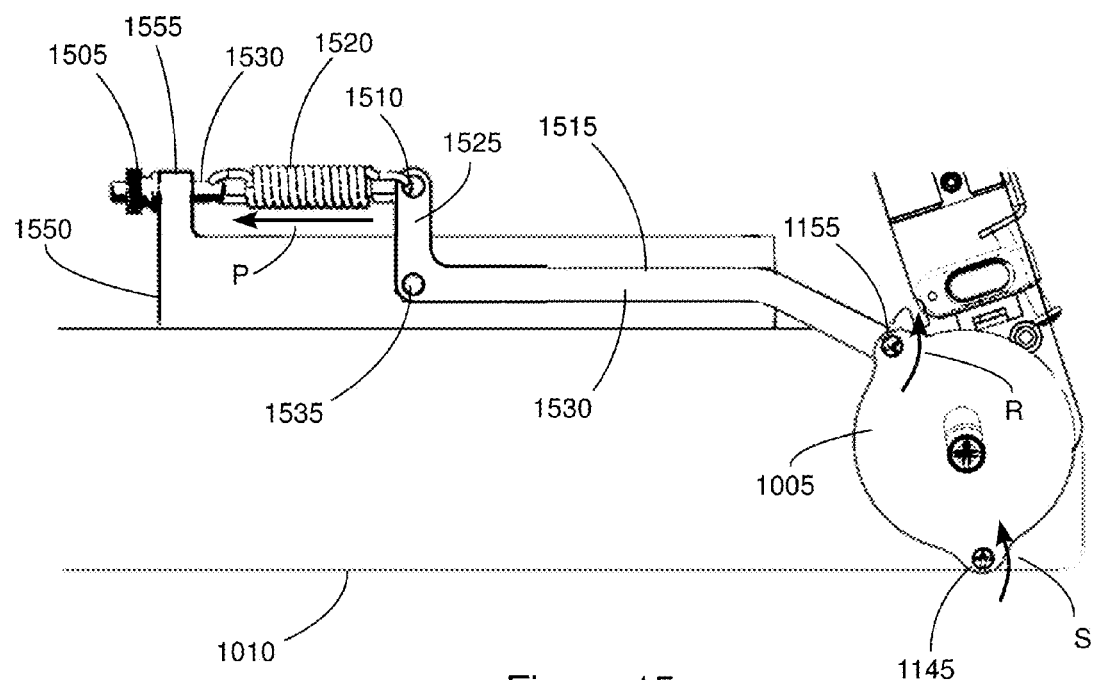
FIG. 15 is a cross-sectional view of an embodiment of the speed control of the present invention.

FIGS. 14 and 15 show embodiments of the cable speed control of the invention that use a rigid or semi-rigid lever and spring in place of the cantilever spring of the embodiment of FIGS. 10-12. In the embodiment of FIG. 14, a lever 1405 is pivotably mounted via axle 1410 to bracket 1450, which is mounted to pulley housing 1010. Lever 1405 may be made of a metal, plastic, wood, a composite, or any other suitable material. A compression spring 1415 is positioned to exert a downwards spring force on an end 1445 of lever 1405 generally in the direction of arrow K. The amount of force exerted by compression spring 1415 on end 1445 of lever 1405 is adjustable, for example by an adjustment screw 1420 that is threaded into a mating hole in bracket 1450. The downward force exerted by compression spring 1415 on end 1445 of lever 1405 is converted by lever 1405 into a generally upward force exerted by lever 1405 on post 1155 of drag assembly 1005 generally in the direction of arrow M. The ratio of the magnitude of the force exerted by compression spring 1415 on end 1445 of lever 1405 to the magnitude of the force exerted by lever 1405 on drag assembly 1005 depends of the position of pivot axle 1410. In the embodiment of FIG. 14, the length of the portion 1425 of lever 1405 between pivot axle 1410 and compression spring 1415 is smaller than the length of the portion 1430 of lever 1405 between pivot axle 1410 and post 1155 of drag assembly 1005. In one or more embodiments, the length of portion 1425 is approximately between one fifth and one third of the length of portion 1430, such that the force exerted by lever 1405 on drag assembly 1005 is approximately between one fifth and one third of the force exerted by compression spring 1415 on end 1445 of lever 1405.

Drag assembly 1005 translates the force exerted by lever 1405 on drag assembly 1005 into an generally upward force exerted by post 1145 (which may include a one-way bearing as in the embodiment of FIGS. 10-12 or a sleeve as in the embodiment of FIG. 13) on cable 1035 (not visible in FIG. 14) generally in the direction of arrow N. The longer length of portion 1430 of lever 1405 compared to the length of portion 1425 of lever 1405 has the effect that displacements of post 1145 caused by variations in the thickness of cable 1035 are translated into smaller displacements of end 1445 of lever 1405 and of compression spring 1415. Post 1145 may thus "float" with imperfections in the thickness of cable 1035 in a similar manner as in the embodiment of FIGS. 10-12 without great variation on the force exerted by post 1145 on cable 1035.

FIG. 15 shows an embodiment of the speed control of the invention that utilizes an extension spring 1520 instead of the compression spring 1415 of the embodiment of FIG. 14. In the embodiment of FIG. 15, lever 1515 comprising a dogleg 1525 and an arm 1530 is pivotably attached to bracket 1550 via pivot axle 1535. Extension spring 1520 extends between a hole 1510 in the end of dogleg 1525 and a pivot pin 1530 mounted to a projection 1555 of bracket 1550. Thumb nut 1505 adjusts the tension that extension spring 1520 exerts on dogleg 1525 of lever 1515 generally in the direction of arrow P. Lever 1515 transforms the tension exerted by spring 1520 on dogleg 1525 into a generally upward force exerted by arm 1530 of lever 1515 on post 1155 of drag assembly 1005 generally in the direction of arrow R. Drag assembly translates the generally upward force exerted by lever 1515 on post 1155 into a generally upward force exerted by post 1145 (which may include a one-way bearing or sleeve) on cable 1035 (not shown in FIG. 15) generally in the direction of arrow S. The ratio of the force exerted by post 1145 on cable 1035 depends on the ratio of the length of dogleg 1525 of lever 1515 to the length of arm 1530 of lever 1515. In one or more embodiments, the length of dogleg 1525 is approximately between one fifth and one third of the length of arm 1530, and the ratio of the force exerted by post 1145 on cable 1035 is approximately between one fifth and one third of the tension exerted by spring 1520 on dogleg 1525. As in the embodiment of FIG. 14, the length of arm 1530 compared to dogleg 1525 allows post 1145 to "float" with imperfections in the thickness of cable 1035 in the same manner as in the embodiment of FIGS. 10-12.

Figure 16:
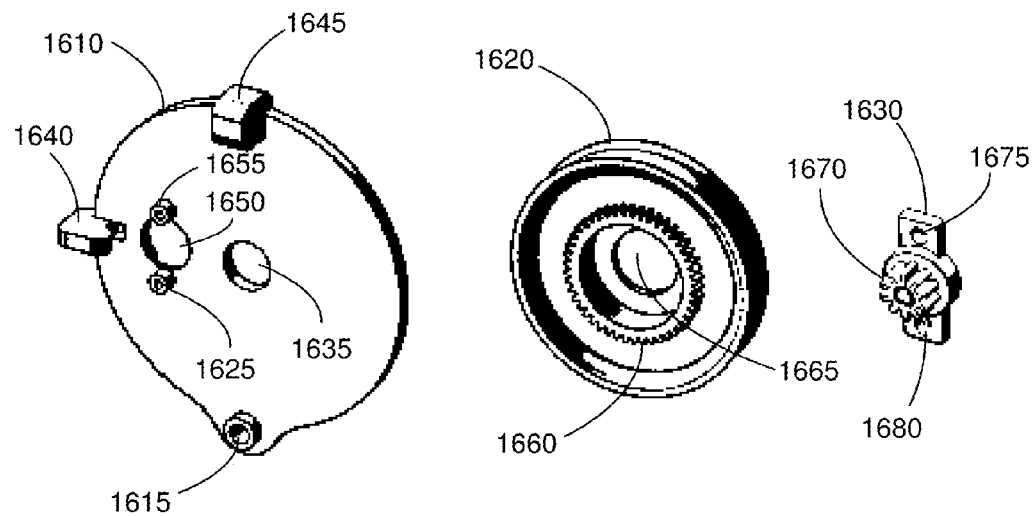
FIG. 16 is a perspective view of components of an embodiment of the speed control of the present invention.
Figure 17:
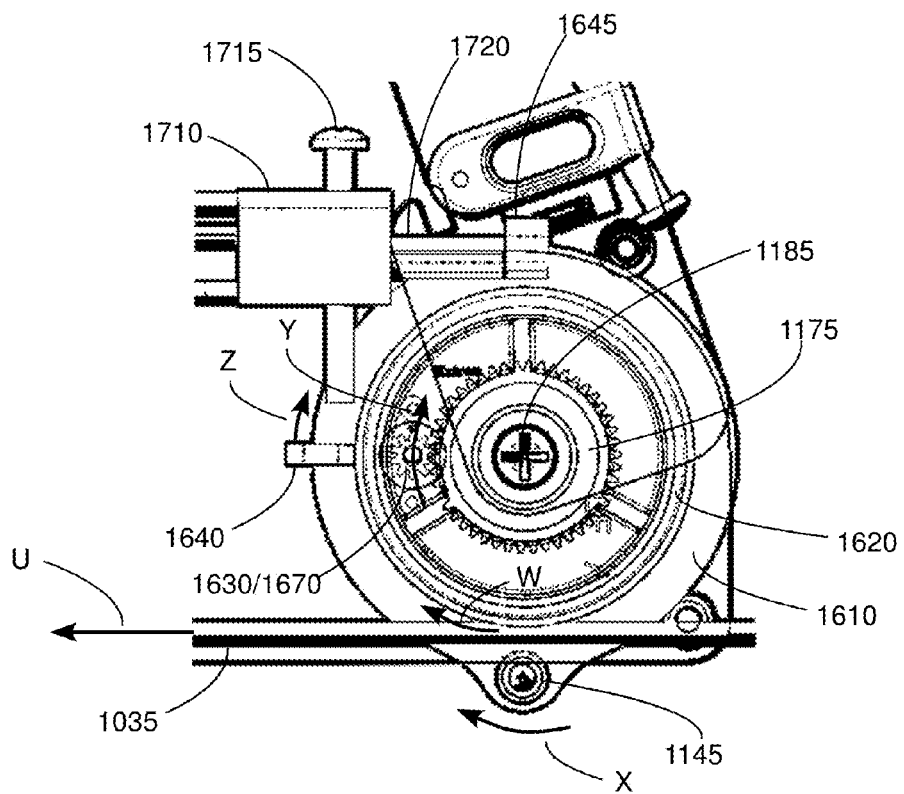
FIG. 17 is a detail view of an embodiment of the speed control of the present invention.
Figure 18:
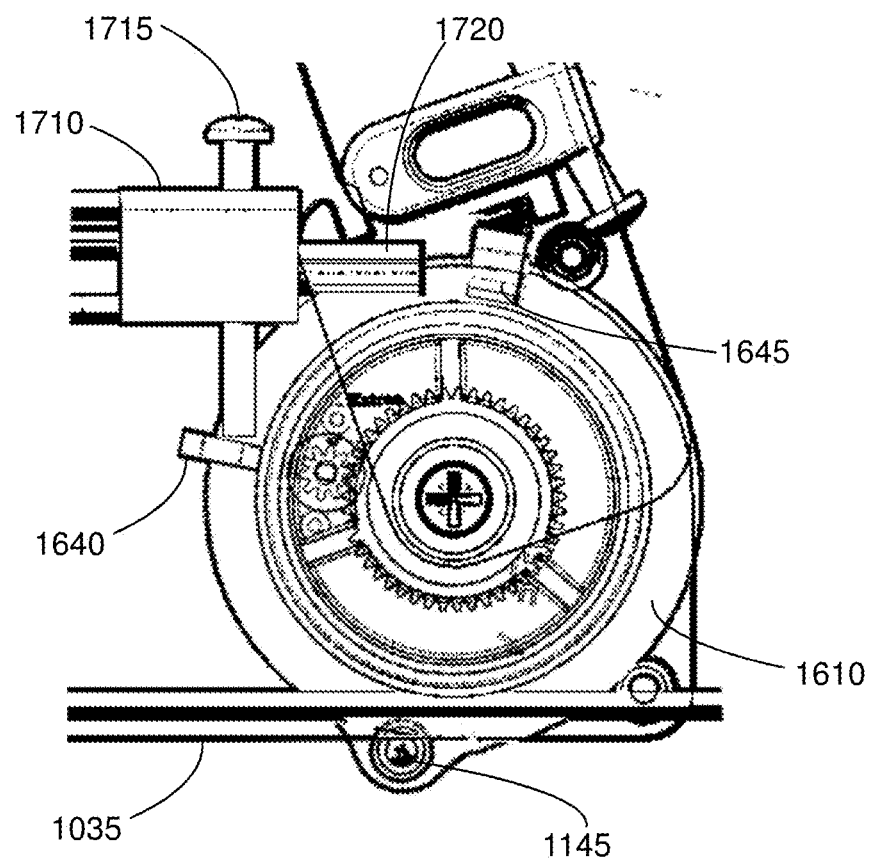
FIG. 18 is a detail view of an embodiment of the speed control of the present invention.

FIGS. 16-18 show an alternative embodiment of a speed control for a cable retractor of the invention. Three components of this embodiment are shown in FIG. 16. These components include a flange plate 1610, a pulley 1620, and a rotary damper assembly 1630. Rotary damper assembly 1630 includes a gear 1670 mounted to a rotary damper as are known to those of ordinary skill in the art. Flange plate 1610 includes a central opening configured to allow flange plate 1610 to be mounted to, for example, pulley axle 1185 of cable retractor 1000 of the embodiment of FIG. 11 in place of end plate 1070. Flange plate 1610 also includes a second opening 1650 sized to accept gear 1670 of rotary damper assembly 1630, projections 1640 and 1645, and mounting bosses 1615, 1625 and 1655. Mounting bosses 1625 and 1655 are configured to align with mounting holes 1675 and 1680 of rotary damper assembly 1630 and to accept fasteners (e.g. screws) for mounting damper assembly 1630 such that gear 1670 faces and projects through opening 1650 into the plane of FIG. 16.

Pulley 1620 includes a central bore 1665 configured to accept a bearing, such as, for example, pulley bearing 1175 of the embodiment of FIG. 11. Pulley 1620 also includes gear teeth 1660 configured to mesh with gear 1670 of rotary damper assembly 1630 when rotary damper assembly 1630 is mounted to flange plate 1610 and flange plate 1610 and pulley 1620 are mounted to the same axle, for example pulley axle 1185 of the embodiment of FIG. 11.

FIG. 17 is a front partially transparent view showing the components of FIG. 16 as well as additional components as mounted to, for example, pulley housing 1010 of the embodiment of FIG. 11. In FIG. 17, rotary damper assembly 1630 is shown mounted to flange plate 1610, and both flange plate 1610 and pulley 1620 are shown mounted to pulley axle 1185. Also included in the embodiment of FIG. 17 are a stop block 1710 mounted to pulley housing 1010 that includes a fixed stop 1720 and an adjustable stop 1715. Fixed stop 1720 may, for example, comprise a fixed projection of stop block 1710. Adjustable stop 1715 may, for example, comprise a threaded screw that threads into a mating threaded hole in stop block 1710. Adjustable stop 1715 is configured to prevent rotation of flange plate 1610 and end plate 1705 in the clockwise direction beyond the (adjustable) point at which projection 1640 of flange plate 1610 contacts adjustable stop 1715. Fixed stop 1720 is configured to prevent rotation of flange plate 1610 in the counterclockwise direction beyond the point at which projection 1645 contacts fixed stop 1720.

The operation of the speed control of FIG. 17 is as follows. When cable 1035 retracts in the direction of arrow U (for example after cable stop actuator button 132 of the embodiment of FIG. 1 is activated), friction between cable 1035 and pulley 1620 causes pulley 1620 to rotate clockwise in the direction of arrow W. The clockwise rotation of pulley 1620 causes gear 1670 of rotary damper assembly 1630 to spin in a counterclockwise direction, which causes rotary damper assembly 1630 to exert a force on flange plate 1610 to which it is mounted in the general direction of arrow Y. The magnitude of the force depends on the rotation speed of pulley 1620 and the damping characteristics of the rotary damper assembly 1630.

The force exerted by rotary damper assembly 1630 on flange plate 1610 in the direction of arrow Y causes flange plate 1610 and end plate 1705 to rotate about pulley axle 1175 generally in the direction of arrow Z. Such rotation causes post 1145 or any sleeve or bearing mounted on post 1145 first to contact cable 1035, as shown in FIG. 18. If the force exerted by damper assembly 1630 on flange plate 1610 is great enough, and adjustable stop 1715 is adjusted such that projection 1640 has not yet contacted adjustable stop 1715, rotation of flange plate 1610 continues, causing a bend in cable 1035 at the point of contact between post 1145 or any sleeve or bearing mounted on post 1145 and cable 1035. The contact between post 1145 or any sleeve or bearing mounted on post 1145 and cable 1035 plus any bend induced in cable 1035 creates friction on cable 1035, slowing its retraction speed. As the retraction speed of cable 1035 slows, the rotation speed of pulley slows and the force exerted by rotary damper assembly on flange plate 1610 is reduced. Flange plate 1610 start rotating counterclockwise back towards their rest position, reducing the friction exerted by post 1145 or any sleeve or bearing mounted on post 1145 on cable 1035, thereby allowing the retraction speed of cable 1035 to once again increase. This feedback characteristic causes an average retraction speed that is regulated by the damping characteristics of rotary damper assembly 1630 and the position of adjustable stop 1715.

When cable 1035 is extended, the force exerted by rotary damper assembly 1630 on flange plate 1610 acts to urge flange plate 1610 to rotate counterclockwise until projection 1645 contacts fixed stop 1720, moving post 1145 away from cable 1035 and reducing the friction exerted on cable 1035 during extension.

Thus, a speed control for a cable retractor has been described. Although the present invention has been described with respect to certain specific embodiments, it will be clear to those skilled in the art that the inventive features of the present invention are applicable to other embodiments as well, all of which are intended to fall within the scope of the present invention. For example, an embodiment similar to the embodiment of FIGS. 16-18 could use a spring-loaded post instead of a rotary damper for applying variable resistance to a cable to control retraction speed. The post may, for example, be mounted in a slot in a link that pivots about the same axis as the pulley. The post would be spring loaded to move in the slot to compensate for various cable diameters. The link would pivot to a fixed stop at which the post does not contact the cable when the cable is extended and to an adjustable stop at which the post contacts and puts a bend in the cable when retracted. The amount of pivot would vary the amount of bend the cable is put through changing the retraction speed of the cable. In other embodiments, a mechanism similar to disk brakes on an automobile, motorcycle, bicycle etc. can be used that could be adjusted to vary the resistance to any or all pulleys in the system to regulate the retraction speed. Similarly, a drum brake type system could be used place adjustable resistance on any or all pulleys in the system to regulate the retraction speed. In other embodiments, an adjustable spring member could be used to directly contact the cable similar to a leaf spring. This spring member would be cantilevered so that one end presses the cable against a pulley and the other end is fixed to the cable retractor housing. An adjustment member such as a screw would deflect the spring adjusting the force and thus the retraction speed. In other embodiments, two opposing spring members could be used with the cable running in between. This friction exerted by the spring members on the cable would be adjustable to regulate the retraction speed of the cable. Alternatively, one of the spring members could be replaced with a fixed member. In yet other embodiments, the cable can be configured to run through a device similar to a belay device used in climbing. The belay device could be configured such that as cable speed increases, the device causes the cable to bend and contact a larger surface area of the device, increasing friction and thus regulating and reducing the cable retraction speed. In yet other embodiments, the post that provides friction on the cable could itself be a rotary damper, or be made of an assembly that includes a rotary damper, that would resist turning at a high rate of speed and thus reduce and regulate the retraction speed of the cable. Other embodiments of the present invention will be apparent to those of skill in the art.

What is claimed is:

1. A speed control for a cable retractor, said cable retractor comprising a first pulley mounted to a pulley axle configured to guide a cable into a housing of said cable retractor, said speed control comprising:
   a drag assembly mounted adjacent to said first pulley, said drag assembly comprising a post mounted to a first end plate, said first end plate configured to restrain movement of said post in directions towards and away from a periphery of said first pulley;
   a drag adjustment mechanism mounted to said housing, said drag adjustment mechanism comprising a bracket and a cantilever spring, said cantilever spring comprising a first end attached to said bracket and a second end extending to said drag assembly, said second end of said cantilever spring configured to exert a spring force on said drag assembly so as to bias said post of said drag assembly towards said periphery of said first pulley.

2. The speed control of claim 1 wherein said drag adjustment mechanism comprises an adjustment member configured to adjust said spring force exerted by said cantilever spring on said drag assembly.

3. The speed control of claim 2 wherein said adjustment member comprises a thumb wheel fastener.

4. The speed control of claim 3 wherein said thumb wheel fastener comprises a thumb screw.

5. The speed control of claim 3 wherein said thumb wheel fastener comprises a thumb nut.

6. The speed control of claim 1 wherein said post of said drag assembly is configured to contact a cable disposed between said post and said first pulley.

7. The speed control of claim 6 further comprising a one-way bearing mounted on said post.

8. The speed control of claim 1 wherein said first end plate comprises a first opening and is configured to be mountable on said pulley axle adjacent to a first face said first pulley.

9. The speed control of claim 8 wherein said drag assembly further comprises a second end plate comprising a second opening and configured to be mountable on said pulley axle adjacent to a second face of said first pulley.

10. The speed control of claim 8 wherein said post is disposed between said first and second end plates of said drag assembly.

* * * * *